(12) United States Patent
Barton et al.

(10) Patent No.: US 6,754,944 B2
(45) Date of Patent: Jun. 29, 2004

(54) METHOD OF CONSTRUCTING LENGTH-ADJUSTABLE VEHICLE STEERING COLUMN ASSEMBLY

(75) Inventors: Laurence George Herbert Barton, Warwickshire (GB); James Peter Bentley, Warwickshire (GB)

(73) Assignee: NSK Steering Systems Europe Limited, Nottinghamshire (GB)

(*) Notice: Subject to any disclaimer, the term of this patent is extended or adjusted under 35 U.S.C. 154(b) by 0 days.

(21) Appl. No.: 10/124,314

(22) Filed: Apr. 18, 2002

(65) Prior Publication Data

US 2002/0121014 A1 Sep. 5, 2002

Related U.S. Application Data

(62) Division of application No. 09/401,047, filed on Sep. 22, 1999, now Pat. No. 6,389,923.

(30) Foreign Application Priority Data

Sep. 23, 1998 (GB) .............................................. 9820762

(51) Int. Cl.[7] ................................................ B23P 11/00
(52) U.S. Cl. .......................................... 29/436; 29/434
(58) Field of Search .......................... 29/436, 434, 433, 29/428, 450, 453; 74/492, 493; 280/777

(56) References Cited

U.S. PATENT DOCUMENTS

| 4,667,530 A | 5/1987 | Mettler et al. ................. 74/493 |
| 5,152,627 A | 10/1992 | Arnold ........................ 403/109 |
| 5,243,874 A | 9/1993 | Wolfe et al. .................. 74/493 |
| 5,348,345 A | 9/1994 | Dykema et al. ............. 280/777 |
| 5,383,811 A | 1/1995 | Campbell et al. ............. 464/89 |
| 5,509,324 A | 4/1996 | Cymbal ........................ 74/492 |
| 5,722,300 A | 3/1998 | Burkhard et al. ............. 74/493 |
| 5,758,545 A | 6/1998 | Fevre et al. .................. 74/493 |

FOREIGN PATENT DOCUMENTS

| GB | 2 205 149 A | 11/1988 |
| GB | 2 253 024 A | 8/1992 |

*Primary Examiner*—John C. Hong
(74) *Attorney, Agent, or Firm*—Miles & Stockbridge P.C.

(57) ABSTRACT

A method of constructing a length-adjustable vehicle steering column assembly, comprises providing an inner steering column member and an outer steering column member, mounting the inner steering column member in the outer steering column member by use of a bush, the bush being fixed by adhesive in the outer steering column member and having the inner steering column member slidingly received therein such that the two steering column members are relatively axially adjustable.

15 Claims, 1 Drawing Sheet

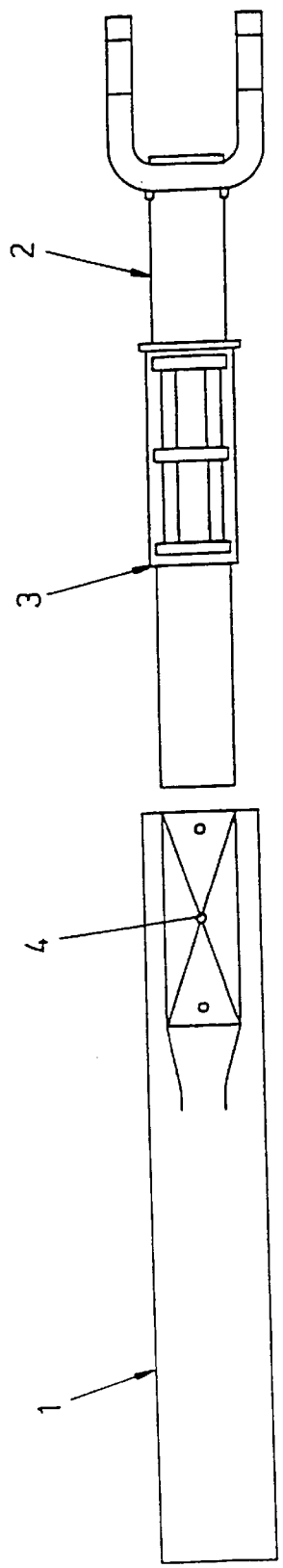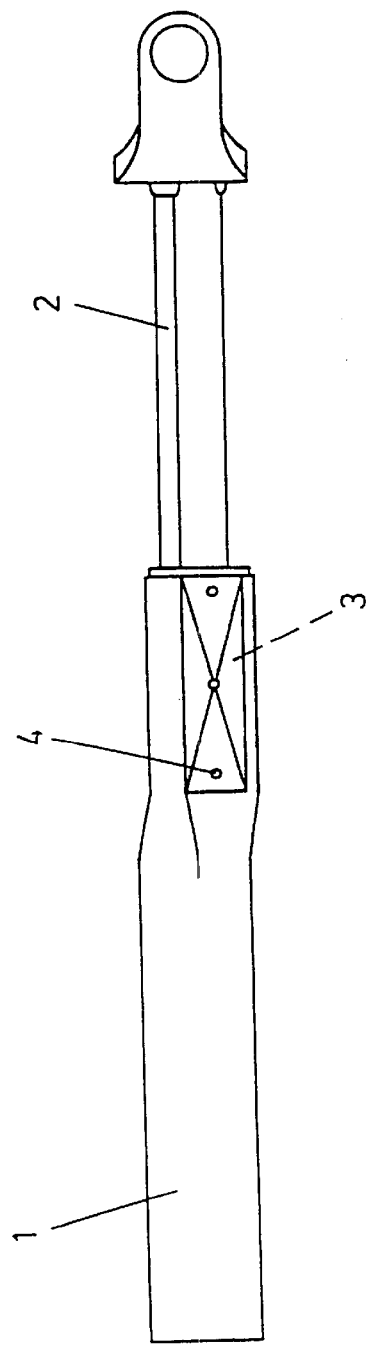

METHOD OF CONSTRUCTING LENGTH-ADJUSTABLE VEHICLE STEERING COLUMN ASSEMBLY

This application is a division of application Ser. No. 09/401,047 filed Sep. 22, 1999 now U.S. Pat. No. 6,389,923.

BACKGROUND OF THE INVENTION

This invention relates to vehicle steering column assemblies and more particularly to length-adjustable shafts for use in such adjustable steering column assemblies and methods of constructing length-adjustable steering column assemblies.

Steering column assemblies which are adjustable axially (reach adjustable) normally include an inner steering column member mounted in an outer steering column member, the two column members being relatively slidable to allow for the axial adjustment. Normally, the inner and outer steering column members are of non-circular cross section to transmit torque between them, and a triangular configuration is common. To inhibit vibration between the two members, it is common to mount a bush between them, so that one can slide relatively to the other. It is common practice for the bush to be pressed on, or to be permanently fixed by staking or by other means on the inner steering column member. The combination of the bush and inner steering column member is then designed, by close tolerance between the outer form of the bush and the inner form of the outer steering column member, to slide, thus allowing the required axial adjustment.

Problems associated with this are that the outer steering column member, which is tubular in the region of the bush, must be parallel over a length sufficient to cover the length of the bush and also the length of the axial adjustment stroke. All three components, therefore, have to be accurately controlled for dimensional tolerance, which is costly, especially for components with non-circular cross sections, and, in addition, there will always be a clearance required for manufacturing tolerances. This will result in a potential backlash and "chuckle", i.e. axial rock of the inner column member in the outer.

The foregoing illustrates limitations known to exist in present telescopic shafts for use in adjustable steering columns. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a vehicle steering column assembly comprising an inner column member mounted in an outer column member, the two column members being relatively slidable to allow axial adjustment of the steering column; and a bush mounted with a sliding fit on the inner member inside the outer member, said bush being fixed within said outer member.

The foregoing and other aspects will become apparent from the following detailed description of the invention when considered in conjunction with the accompanying drawings.

BRIEF DESCRIPTION OF THE DRAWINGS

FIG. 1 is a schematic side view of components of a vehicle steering column prior to assembly; and FIG. 2 is a schematic side view of the components shown in FIG. 1 after assembly.

DETAILED DESCRIPTION

The drawings show a shaft for a vehicle steering column assembly including an outer steering column member 1, an inner steering column member 2, and a bush 3 slidably mounted with an interference fit on the inner steering column member 2. In the form illustrated, the inner and outer members 1 and 2 are triangular tubes and the bush 3 is a plastics molded part with good inherent tolerances to have a good sliding fit on the inner triangular tube 2. To prevent the bush 3 from being removed from the tube 2, the free end of the tube 2 is provided with a stop such as by peening.

The tube 2 with its bush 3 assembled thereon is then inserted in the outer tube 1 until the bush 3 lies wholly within the tube 1 as shown in FIG. 2. Holes 4 are provided through the wall of the outer tube 1 in the region over the inserted bush 3, these holes 4 acting as fill holes for adhesive, which is injected through the fill holes to retain the bush 3 securely within the outer tube 1. The adhesive is preferably a cold adhesive.

When the adhesive has cured, the bush is fixed within the outer member, but the inner tube 2 can slide freely within the bush 3; and, since the bush 3 has always a light interference on the inner tube 2, there is no free play in the system, the comparatively thin wall of the bush 3 taking the shape of the inner tube 2. No additional pressure is provided by the bonding process of the bush 3 and outer tube 1 during injection of the adhesive nor during the curing thereof. Also, the bore of the outer tube 1 does not need to be machined to have a close tolerance with the bush 3, since the adhesive fills any gaps between the bush and the outer tube member.

To summarize, lash defects are eliminated from adjustable steering columns by the unique features of the invention. Preferably, the bush is secured within the outer steering column member by the adhesive which is injected through fill holes in the outer steering column member. Removal of the bush from the inner steering column member is prevented by a stop provided near the free end of the steering column member. The outer steering column member has an inner non-circular profile, and the inner steering column member, which may be a tube or shaft, has a matching outer non-circular profile. The inner steering column member can be extruded. The bush can be a plastics molded part arranged to have a good sliding fit with light interference on the inner steering column member. The adhesive which is injected between the outer member and the bush takes-up any slack between them, thereby permitting fabrication of the outer member and the bush to ordinary manufacturing tolerances.

What is claimed is:

1. A method of constructing a length-adjustable vehicle steering column assembly, comprising:

providing an inner steering column member and an outer steering column member;

mounting the inner steering column member in the outer steering column member by use of a bush, the bush being fixed by adhesive in the outer steering column member and having the inner steering column member slidingly received therein such that the two steering column members are relatively axially adjustable.

2. A method according to claim 1, wherein the adhesive is injected through fill holes provided in the outer steering column.

3. A method according to claim 1, wherein the bush is assembled on the inner steering column member and there-after inserted with the inner steering column member into the outer steering column member and fixed within the outer steering column member to mount the inner steering column member in the outer steering column member.

4. A method according to claim 3, wherein a stop is provided in the region of a free end of the inner steering column member to prevent axial separation of the bush and the inner steering column member.

5. A method according to claim 3, wherein the adhesive is injected through fill holes provided in the outer steering column member.

6. A method according to claim 3, wherein the bush is a plastics molded part arranged to have a sliding fit with interference on the inner steering column member.

7. A method according to claim 6, wherein the outer steering column member has an inner non-circular profile and the inner steering column member has an outer non-circular profile.

8. A method according to claim 1, wherein the bush is a plastics molded part arranged to have a sliding fit with interference on the inner steering column member.

9. A method of constructing a length-adjustable vehicle steering column assembly, comprising:

providing an inner steering column member and an outer steering column member;

assembling a bush on the inner steering column member the inner steering column member being slidable within the bush;

inserting the inner steering column member with the bush thereon into the outer steering column member; and fixing the bush within the outer steering column member such that the two steering column members are relatively slidably adjustable.

10. A method according to claim 9, wherein the bush is secured within the outer steering column member by adhesive.

11. A method according to claim 10, wherein the adhesive is injected through fill holes provided in the outer steering column member.

12. A method according to claim 9, wherein a stop is provided in the region of a free end of the inner steering column member to prevent axial separation of the bush and the inner steering column member.

13. A method according to claim 9, wherein the bush is a plastics molded part arranged to have a sliding fit with interference on the inner steering column member.

14. A method according to claim 9, wherein the outer steering column member has an inner non-circular profile and the inner steering column member has an outer non-circular profile.

15. A method according to claim 10, wherein the bush is a plastics molded part arranged to have a sliding fit with interference on the inner steering column member.

* * * * *